(No Model.)
J. F. McELROY.
ELECTRIC HEATER.
No. 598,640. Patented Feb. 8, 1898.
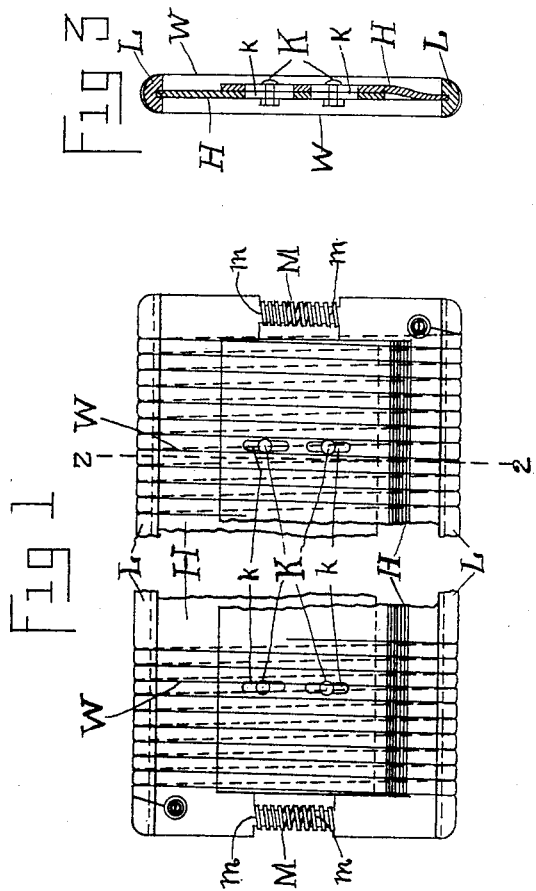
Witnesses
Inventor
James F. McElroy,
by Ward & Cameron,
Attys

United States Patent Office.

JAMES F. McELROY, OF ALBANY, NEW YORK, ASSIGNOR TO THE CONSOLIDATED CAR-HEATING COMPANY, OF SAME PLACE.

ELECTRIC HEATER.

SPECIFICATION forming part of Letters Patent No. 598,640, dated February 8, 1898.

Original application filed April 6, 1895, Serial No. 544,727. Divided and this application filed August 6, 1897. Serial No. 647,347. (No model.)

*To all whom it may concern:*

Be it known that I, JAMES F. MCELROY, a citizen of the United States, residing in the city and county of Albany, State of New York, have invented a new and useful Improvement in Electric Heaters, of which the following is a specification.

My invention relates to improvements in devices for heating by electricity; and the object of my invention is to provide a compressible heater-frame about which a resistance may be wound and which will adapt itself to the pressure of the wire caused by the expansion and contraction thereof. I accomplish this object by means of the mechanism illustrated in the accompanying drawings, in which—

Figure 1 is an elevation. Fig. 2 is an end view of Fig. 1, and Fig. 3 is a cross-section along the lines 2 2 on Fig. 1.

Similar letters refer to similar parts throughout the several views.

Ordinarily the frame of an electric heater has been made rigid and the wire wound upon the frame is on a practically incompressible insulator. The result has been that when a current has been passed through the wire, heating it to a very high temperature, the expansion of the wire causes it to buckle, become loose upon the frame, and in many cases to short-circuit. It is to obviate this difficulty and to maintain a constant and even pressure at all times upon the resisting-wire that I have constructed a compressible frame so arranged that when the wire expands with heat the frame also expands, thus maintaining a constant and even tension on the wire. This tension should be sufficient to keep the wire stretched, but not in any way to injure its life while heated. As the wire cools and contracts the frame will yield sufficiently to maintain an even tension on the wire.

A division having been required by the examiner in charge of my application for patent filed April 6, 1895, Serial No. 544,727, in which a description of the invention herein was originally set forth, as a modified form this application is made.

Referring to the drawings, I construct the frame H H in two parts, adjustably held together by the bolts K K, each part of the frame provided with an insulator L L at its edge, and the two parts capable of moving slightly upon each other by means of the slots $k$ $k$ and the bolts K K, passing through them. At the ends of the heater I place the coiled springs M M around the rods $m$ $m$, each of said springs having one end resting against one portion of the frame H and the other end resting against the other portion of said frame H and adjustable in such a manner that as the halves of the frame are drawn together the springs M M will become compressed. Around the insulators L L, I wind the wire W.

When the wire becomes heated, it expands, and the springs M will keep the insulators in contact with the wires, preventing bunching and short-circuiting. When the wires become cool and contract, the frame will become compressed by the action of the wires against the tension of the springs.

What I claim as my invention, and desire to secure by Letters Patent, is—

An electric heater comprising in combination two overlapping plates adapted to slide relative to each other and provided with insulating edges, means for connecting the plates together, springs arranged between the plates tending to force them apart, and a resistance-wire wound around the plates.

JAMES F. McELROY.

Witnesses:
 CHAS. B. MITCHELL,
 MARY AGNES BURKE.